United States Patent Office 3,642,852
Patented Feb. 15, 1972

---

3,642,852
PROCESS OF PRODUCING HALOSILOXANES
Gerd Rossmy, Essen-Werden, and Gotz Koerner, Essen, Germany, assignors to Th. Goldschmidt A.-G., Essen, Germany
No Drawing. Filed Jan. 16, 1969, Ser. No. 791,788
Claims priority, application France, Jan. 16, 1968, 136,129
Int. Cl. C07f 7/08
U.S. Cl. 260—448.2 E                                   6 Claims

ABSTRACT OF THE DISCLOSURE

Process of producing certain halosiloxanes by reacting the corresponding alkylhalosilane with an excess of trimethylhalosilane in the presence of tertiary aliphatic alcohols at temperatures below 40° C. The process is advantageously carried out in the presence of a hydrogen halide.

---

FIELD OF THE INVENTION

A process for the preparation of halosiloxane of the general formula $$[(CH_3)_3SiO]_b-\underset{\underset{R_a}{|}}{Si}-X_{4-(a+b)} \qquad I$$

wherein R is hydrogen, alkyl, or aryl; X is halo, $a=0$ or 1; $b=1$, 2 or 3 and $(a+b)=2$ or 3.

DESCRIPTION OF THE PRIOR ART

Processes for the preparation of the desired compounds known in the prior art have been found unsatisfactory. In one process the synthesis is attempted by the cohydrolysis of the corresponding trimethylhalosilane and tri- or tetrahalosilane. This prior art process results in a mixture of siloxanes of higher molecular weight and marked and varying chain branching. It is also found that the reaction product of this process is often contaminated with considerable amounts of gel-like material. The yield of the desired siloxane in the reaction product is relatively negligible. It is believed that the reason for this unsatisfactory result lies in the higher reactivity of the tri- and tetrahalosilanes compared to that of the trimethylhalosilanes. Hence the former are preferentially hydrolyzed and, in a state of partial or complete hydrolysis, primarily undergo mutual condensation reactions, rather than co-hydrolyzing with trimethylhalosilane to a significant extent.

In U.S. Pat. 3,101,361 there is disclosed a process for preparing, inter alia, the desired products by equilibration reaction of hexamethyldisiloxane and tetrachlorosilane. After a considerable reaction time, which may be more than 100 hours, a mixture of different products, peculiar for each equilibration reaction, is formed. Where hexamethyldisiloxane and tetrachlorosilane are equilibrated, this mixture has the following constituents:

$[(CH_3)_3SiO]_4Si$, $[(CH_3)_3SiO]_3SiCl$, $[(CH_3)_3SiO]_2SiCl_2$
and
$[(CH_3)_3SiO]SiCl_3$ The aforementioned compounds constitute but the major portion of the reaction mixture. The composition of this product mixture corresponds to statistical probabilities, and it has not been found possible to modify or direct the reaction in such a manner that the desired reaction product predominates.

It was therefore desirable to find a process for the preparation of the desired product which would give rise to this product in good yield, in a simple manner and in a reasonable reaction time.

SUMMARY OF THE INVENTION

There is provided a process for the preparation of a certain halosiloxane of the general formula $$[(CH_3)_3SiO]_b-\underset{\underset{R_a}{|}}{Si}-X_{4-(a+b)}$$

wherein R is hydrogen, alkyl, or aryl; X is halo; $a=0$ or 1; $b=1$, 2 or 3 and $(a+b)=2$ or 3. In this process, one mole of a silane having the formula $R_aSiX_{4-a}$ and from about $2b$ to about $5b$ moles of a trimethylhalosilane are reacted in the presence of $b$ moles of a tertiary aliphatic alcohol at a temperature of between about $-40°$ and about $250°$ C. The process is preferably carried out in the presence of a hydrogen halide which is passed through the reaction mixture. The reaction may be represented as follows:

$$b(CH_3)_3SiX + R_aSiX_{4-a} + bt-C_nH_{2n-1}OH$$

$$\downarrow -C_nH_{2n}/-HX$$

$$[(CH_3)_3SiO]_b-\underset{\underset{R_a}{|}}{Si}-X_{4-(a+b)}$$

wherein $n$ is a whole number having a value between 4 and 10.

DESCRIPTION OF THE PREFERRED EMBODIMENTS

In the preferred embodiments of the reaction for the preparation of a compound of Formula I, R is hydrogen, alkyl or aryl. Alkyl containing between 1 and 20 carbon atoms, for example, lower alkyl such as methyl, ethyl, propyl, butyl, and the like as well as the medium chain length alkyls such as octadecyl and the like are suitable. Metyhl is the preferred alkyl. As aryl, phenyl or substituted phenyl may be used, wherein said substituent group may be lower alkyl such as methyl, ethyl, propyl and the like or halo such as chloro, bromo, or fluoro. X is halo suitably chloro or bromo and $(a+b)$ is preferably 3.

The tertiary aliphatic alcohols utilized in this reaction are preferably tertiary alkanols, most suitably tertiary lower alkanols, for example, 2-methyl-2-propanol, 2,3-dimethyl-2-butanol, 2-methyl-butanol, 2,3-trimethyl-2-butanol, 3,3-dimethyl-2-butanol, 2,3-dimethyl-2-pentanol, 2,4-dimethyl-3-pentanol, 3-ethyl-3-pentanol, 3-methyl-3-pentanol, and 2,4,4-trimethyl-2-pentanol. The preferred alcohol is t-butanol.

While this reaction may be carried out in a temperature range of between $-40°$ and $250°$ C., it should be performed at temperatures below 40° C. This temperature of 40° C. is not critical to the total success of the reaction, however, it has been found at temperatures greater than 40° C. alkoxysilanes are produced as a result of side reactions between the tertiary alcohol and the halosilanes. It will be understood by those skilled in the art that this side reaction does not commence suddenly at a particular temperature but becomes more favored within a certain temperature range. Thus it has been found that below 40° C. the alkoxysilanes are not produced in substantial amounts, whereas at temperatures above 40° C. the side reaction producing the alkoxysilanes starts to interfere with the process of producing the desired product to significant degree. The 40° C. temperature value is therefore not an exact limit value.

In the process of the reaction, the haloalkylsilane and the trimethylhalosilane are mixed and agitated and hydrogen halide is added, suitably by passing a slow stream thereof in anhydrous gaseous form through the reaction mixture. Meanwhile the tertiary alcohol is slowly added to the reaction mixture, suitably in a dropwise fashion. During the course of the reaction the temperature of the reactants is maintained in the desired range, suitably by immersion of the reaction vessel in a bath through which passes water from the cold water main or by cooling the reaction vessel with ice water or inorganic coolant with a temperature below 0° C.

After completion of the reaction, the reaction mixture is warmed and the low-boiling components are removed by distillation at atmospheric pressure. These low-boiling components will include olefinic hydrocarbons derived from the tertiary alcohol as well as the corresponding chloroalkanes.

In the process of the present invention it is particularly important that pure starting materials are used. The underlying reason for this requirement is that it is necessary to avoid the occurrence of equilibration reactions during the distillation stage of the workup of the reaction products. Hence, it is important to use pure silanes as a starting material. It is particularly important that these silanes be free of iron salts.

In accordance with the present invention it is possible to produce a number of particularly interesting halosiloxanes. Among these are compounds of the following formula:

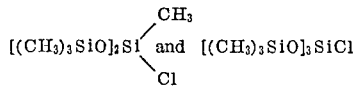

The products of the present process are used for the purpose of imparting hydrophobic properties to surfaces. For example, to impart a hydrophobic surface to a silicate surface. The products are also useful as intermediates for further synthesis. For example, the compounds may be converted to the corresponding hydroxysiloxane by the hydrolytic removal of the halo group in the presence of an acid acceptor. Such a reaction may be schematically represented as follows:

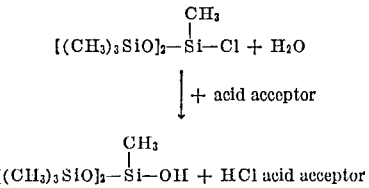

Alternatively, the compounds produced by the present process may be condensed with hydroxy containing siloxane which the elimination of the corresponding hydrogen halide. Such a reaction may be schematically represented as follows:

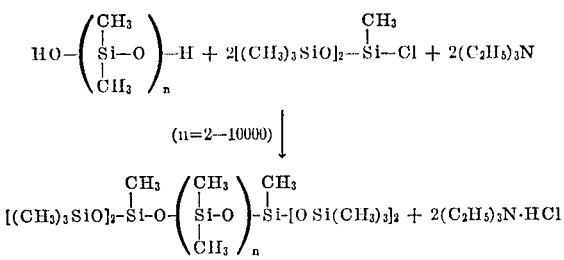

The invention will now be described by an example, it being understood, however, that this example is given by way of illustration and not by way of limitation and that many changes may be effected without affecting in any way the scope and spirit of this invention as recited in the appended claims.

EXAMPLE

Preparation of 1,1,1,3,5,5,5-heptamethyl-3-chlorotrisiloxane 448.5 g. (3.0 mole) of freshly distilled methyltrichlorosilane and 1954 g. (18.0 mole) of freshly distilled trimethylchlorosilane are mixed in a three-neck flask. The mixture is stirred and a slow stream of dry gaseous hydrogen chloride is passed therethrough. 445.2 g. (6.0 mole) of t-butanol are added in dropwise manner to the reaction mixture over a period of 4 hours. During the reaction time the temperature of the reaction mixture is maintained below 40° C. by immersion of the reaction vessel in a cold water bath. Upon the completion of the reaction, the mixture is warmed slowly and the low-boiling product removed under atmospheric pressure. According to gas chromatographic analysis, the residue contained 52.5% of the theoretical amount of the above trisiloxane, calculated on the amount of supplied methyltrichlorosilane. The residue is then distilled at atmospheric pressure through a fractional distillation column to yield the desired heptamethyl-3-chlorotrisiloxane in 34.5% yield (based on charged methyltrichlorsilane) B.P. 167/169° C.

In accordance with the foregoing procedure but where, in place of using trimethylchlorosilane, there is used trimethylbromosilane, there is obtained the same product.

In accordance with the procedure of the principal example but where, in place of using t-butanol, there is used 2-methylpentanol or 2-methylbutanol, there is obtained the same product.

In accordance with the procedure of the principal example but, in place of utilizing methyltrichlorosilane, using propyltrichlorosilane, tetrachlorosilane, tribromophenylsilane, and octadecyl trichlorosilane, there is obtained the corresponding 1,1,1,5,5,5-hexamethyl-3-propyl-3-chlorotrisiloxane
1,1,1,5,5,5-hexamethyl-3,3-dichlorotrisiloxane
1,1,1,5,5,5-hexamethyl-3-phenyl-3-bromotrisiloxane
1,1,1,5,5,5-hexamethyl-3-octadecyl-3-chlorotrisiloxane In accordance with the principal example, but utilizing 6 moles of methyltrichlorosilane in place of 3 moles thereof and the same quantities of the other reactants, there is obtained 1,1,1,3-tetramethyl-3,3-dichlorodisiloxane.

What is claimed is:

1. A process for the preparation of halosiloxanes of the general formula

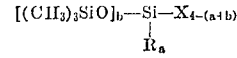

wherein R is hydrogen, alkyl of 1–18 carbon atoms or phenyl; X is chlorine or bromine, $a=0$ or 1; $b=1$, 2 or 3 and $(a+b)=2$ or 3; which comprises reacting $b$ moles of a tertiary aliphatic alcohol containing 4–8 carbon atoms with 1 mole of a silane of the formula $R_aSiX_{4-a}$ and between about $2b$ to $5b$ moles of a silane of the formula $(CH_3)_3SiX$ at a temperature of between about $-40°$ and about 250° C., wherein R, X, and $b$ are as above.

2. A process as claimed in claim 1, wherein the tertiary aliphatic alcohol is added to a mixture of said silanes in dropwise manner.

3. A process as claimed in claim 1, wherein a stream of hydrogen halide gas is passed through the reaction mixture.

4. A process according to claim 1, wherein R is methyl or phenyl, the alcohol is a tertiary lower alkanol and the reaction is carried out at a temperature of less than about 40° C.

5. A process according to claim 1, wherein $(a+b)$ have the value 3.

6. A process for the preparation of 1,1,1,3,5,5,5-heptamethyl-3-chlorotrisiloxane which comprises reacting methyltrichlorosilane and trimethylchlorosilane with t-butanol in the prence of hydrogen chloride at a temperature of less than about 40° C., wherein the molar ratio of methyltrichlorosilane:trimethylchlorosilane:t-butanol is about 1:6:2.

References Cited

UNITED STATES PATENTS

| 3,432,538 | 3/1969 | Curry | 260—448.2 E |
| 3,484,468 | 12/1969 | Curry | 260—448.2 E |

TOBIAS E. LEVOW, Primary Examiner

P. F. SHAVER, Assistant Examiner

U.S. Cl. X.R.

260—46.5 R